L. C. BAYLES.
EXHAUST CLOSING VALVE FOR HOLLOW STEEL PERCUSSIVE DRILLS.
APPLICATION FILED SEPT. 25, 1913.

1,144,991. Patented July 6, 1915.

WITNESSES.
Carl W. Oman
Russell H. Wilhelm

INVENTOR
Lewis C. Bayles
BY
Philip Burwell Cooke
ATTORNEY

UNITED STATES PATENT OFFICE.

LEWIS CONDICT BAYLES, OF EASTON, PENNSYLVANIA, ASSIGNOR TO INGERSOLL-RAND COMPANY, OF JERSEY CITY, NEW JERSEY, A CORPORATION OF NEW JERSEY.

EXHAUST-CLOSING VALVE FOR HOLLOW STEEL PERCUSSIVE DRILLS.

1,144,991. Specification of Letters Patent. Patented July 6, 1915.

Application filed September 25, 1913. Serial No. 791,713.

*To all whom it may concern:*

Be it known that I, LEWIS C. BAYLES, a citizen of the United States, residing at Easton, in the county of Northampton and State of Pennsylvania, have invented a certain new and useful Improvement in Exhaust-Closing Valves for Hollow Steel Percussive Drills, of which the following is a specification.

This invention relates to rock drills wherein air is conveyed to the hole from the cylinder through the steel, and relates more particularly to a cylinder exhaust closing valve for such a drill.

In drills of the type shown, for instance, in the patent to Leyner #604,538, May 24th, 1898, it has been proposed to add a valve which can be closed when desired to shut off the exhaust from the cylinder so that all the air will pass through the drill steel and effectively clear out the hole.

The object of the present invention is to provide a simple and efficient valve for this purpose which will be of small dimensions and which will remain in any desired position, when open or closed, without being affected by the continuous vibration of the drill.

With this object in view, I have devised a valve a practical embodiment of which is shown in the accompanying drawings in which—

Figure 1:
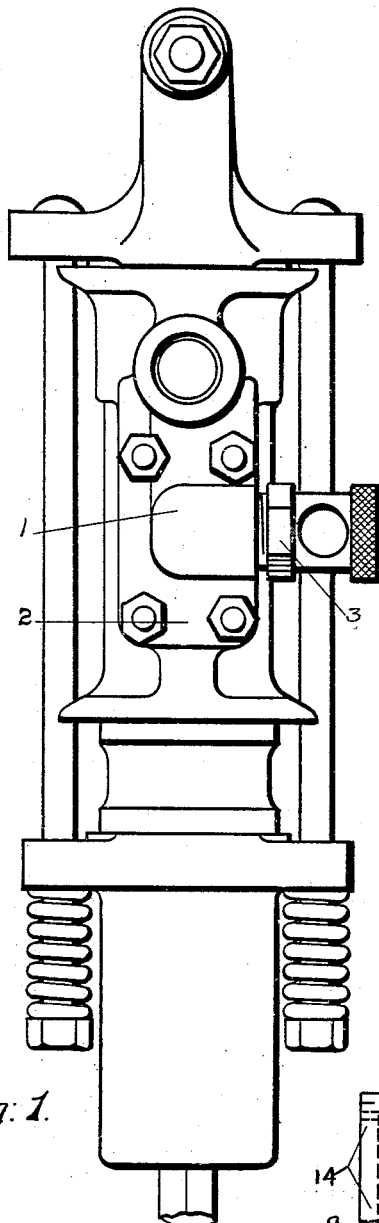
Figure 2:
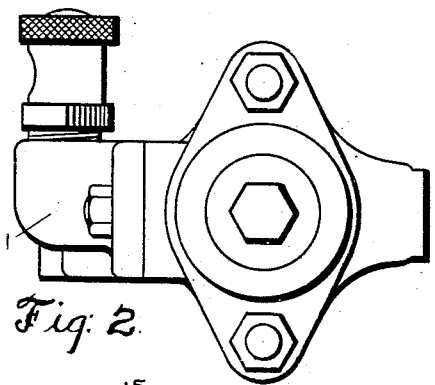
Figures 3, 4:
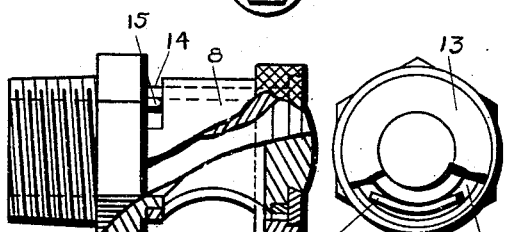
Figure 5:
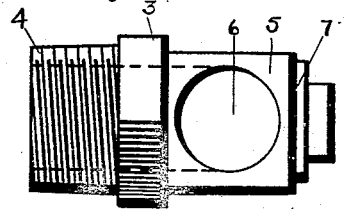
Figures 6, 7:
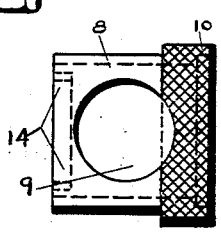

Figure 1 shows a side elevation of a drill with my valve attached thereto, Fig. 2, an end elevation of the drill and valve, Fig. 3, a side elevation partly in section of the valve removed from the drill, Fig. 4, an end elevation of the valve partly broken away to show the retaining spring, Fig. 5, a view of the valve plug before the valve plug and sleeve have been secured in position, Fig. 6, a detail view showing the outer end of the valve sleeve and Fig. 7, a side elevation of the valve sleeve.

As shown, the valve is threaded into the exhaust pipe 1 of a drill 2, of the type shown in the Leyner patent, mentioned above, and comprises a plug 3 having a threaded portion 4 adapted to be threaded into the exhaust pipe of the drill and an outer cylindrical portion 5 in the side of which is a circular opening 6 communicating with the hollow interior of the plug. The cylindrical portion 5 terminates in a head 7 of smaller diameter. Rotatably mounted on the cylindrical portion 5 is a valve closing sleeve 8 provided with a lateral opening 9 adapted to register with the circular opening 6 of the valve plug 3. The outer end 10 of the closing sleeve 8 is of larger diameter and its surface is milled or roughened so that it can be easily grasped by the fingers. The difference between the diameters of the inner side of this outer portion 10 and the outer surface of the head 7 of the valve plug 3, results in an annular groove or slot 11 in which is placed a straight piece of spring steel 12 of such a length that it must be bent or flexed to be inserted in the groove 11 with the result that its inner face frictionally engages the outer surface of the head 7 while the outer surface of its ends engage the inner surface of the outer portion 10 of the closing sleeve 8. To hold the sleeve 8 and the spring 12 against longitudinal movement on the valve plug, a retaining ring 13 is secured to the head 7 of the valve plug 3 in any suitable manner such as by the hammering down of the head 7, as shown in the drawings.

The operation of the device will be evident from the above description. The valve sleeve can be easily turned into any position and by reason of the frictional contact of the spring 12 with the valve sleeve and the valve plug, the valve sleeve will remain in any desired position notwithstanding the constant vibration of the drill from the reciprocation of the piston.

It is to be understood that the present showing and description discloses only one specified modification of my invention and other forms and modifications are included in the spirit and scope of the invention as expressed in the claims.

What I claim is:

1. In an exhaust closing valve for rock drills, a valve plug having a bore and a lateral aperture therefrom, a closing sleeve rotatably mounted on said plug and having an aperture adapted to register with said plug aperture, a retaining ring secured to the end of said valve plug to hold said closing sleeve in position, and a flexed spring interposed between said plug and said sleeve to frictionally oppose relative rotation.

2. In an exhaust closing valve for rock drills, a valve plug having a cylindrical outer portion provided with a lateral aperture and terminating in a head of smaller diameter, a closing sleeve rotatably mounted on said cylindrical portion and having an aperture adapted to register with said plug aperture, a flexed spring interposed between said head of smaller diameter and said closing sleeve and a retaining ring secured to said head to hold said sleeve and said spring in position.

In testimony whereof, I have hereunto set my hand.

LEWIS CONDICT BAYLES.

Witnesses:
C. P. MAHN,
C. S. MILEY.